United States Patent [19]

Chiu et al.

[11] Patent Number: 5,042,892
[45] Date of Patent: Aug. 27, 1991

[54] FIBER OPTIC LIGHT PANEL

[76] Inventors: David Chiu, 33 Roslyn Crt., Port Jefferson, N.Y. 11777; Robert A. Kirzl, 21 Fenwick St., Greenlawn, N.Y. 11740

[21] Appl. No.: 562,892
[22] Filed: Aug. 3, 1990
[51] Int. Cl.[5] .................... G02B 6/00; G02B 6/14
[52] U.S. Cl. ................... 385/114; 362/32; 385/901
[58] Field of Search .... 350/96.10, 96.15, 96.20–96.24; 362/32

[56] References Cited

U.S. PATENT DOCUMENTS

| | | | |
|---|---|---|---|
| 3,114,283 | 12/1963 | Gruner | 88/24 |
| 3,654,452 | 4/1972 | Frey et al. | 240/8.16 |
| 4,128,332 | 12/1978 | Rowe | 355/67 |
| 4,234,907 | 11/1980 | Daniel | 362/32 |
| 4,471,412 | 9/1984 | Mori | 362/32 |
| 4,567,551 | 1/1986 | Choate | 362/398 |
| 4,677,473 | 6/1987 | Okamoto et al. | 358/101 |
| 4,693,552 | 9/1987 | Jeskey | 350/96.24 |
| 4,763,984 | 8/1988 | Awai et al. | 350/96.24 |
| 4,848,868 | 7/1989 | Rohner | 350/96.23 |
| 4,861,135 | 8/1989 | Rohner et al. | 350/96.23 |
| 4,878,732 | 11/1989 | Rohner et al. | 350/96.23 |

Primary Examiner—Akm Ullah
Attorney, Agent, or Firm—Leonard Belkin

[57] ABSTRACT

A light emitting panel formed by a single layer of parallel and contiguously arranged clad optical fibers supplied with light from a source at one end of the panel. The fibers are cemented together and the cladding is removed from the light emitting surface of the panel. In one embodiment, each fiber is looped at the end of the panel remote from the source of light so that both ends of each fiber is connected to the source of light.

15 Claims, 2 Drawing Sheets

FIBER OPTIC LIGHT PANEL

BACKGROUND OF THE INVENTION

This invention relates to a fiber optic light panel and more particularly to an illuminating panel which is extremely thin and capable of providing a very uniform source of light over a wide area.

The invention is particularly applicable for use in digitizing information such as drawings on a sheet of paper. In this application, a light box is required to illuminate the drawings, preferably from behind, but the common light boxes now in use are not satisfactory because the digitizer tablet has to be able to track the cursor/stylus. The cursor has to be typically within ¼" of the tablet to be read accurately by the tablet. Because of this limited distance, standard light boxes cannot be used to illuminate drawings.

In addition, light boxes used in hospitals and doctors' offices to read x-rays are bulky and therefore limited in where they can be employed. Also, conventional light boxes can not be employed in backlighting applications such as control panels and other instrumentation applications where space is limited and maintenance can be a problem.

To meet some of these requirements, fiber optic technology has been applied to produce light panels. The following United States Patents are illustrative of such devices.

U.S. Pat. No. 3,114,283 shows a light pickup ring with so-called light pickup elements which appear to be optical fibers.

U.S. Pat. No. 3,654,452 illustrates automotive instrument panel illuminated by an electric lamp. Light conducting cables carry the light to the panel.

U.S. Pat. No. 4,128,332 teaches an illuminator for an office copier utilizing a light rod having a source of light at each end.

In U.S. Pat. No. 4,234,907 there is shown a light emitting fabric which relies on optical fibers woven into a pattern. The use of bends and notches in the fibers to deliver the light is inefficient as well as having other drawbacks.

U.S. Pat. No. 4,471,412 teaches a light conducting member with points along its length where the light is emitted.

U.S. Pat. No. 4,567,551 discloses a surface illuminator combining light from different sources to direct the light to an area where required.

U.S. Pat. No. 4,677,473 shows a soldering inspection system for directing light to the soldered part from different angles using optical fibers to deliver the light.

U.S. Pat. No. 4,763,984 teaches the use of clad fiber optic light channels with means such as scattering centers to emit the light through the cladding in selected areas.

None of the above patents teaches or suggests the present invention.

SUMMARY OF THE INVENTION

In this invention the drawbacks and problems associated with digitizers, light boxes and light panels in use up to now are largely overcome or reduced by providing a light panel which is made of ribbons of fiber provided with a light source at both ends of the fibers and having means to insure that there is an even distribution of light along the surface of the ribbons where required.

In one embodiment of the invention a ribbon is prepared by adhering together a number of commercially available clad plastic or glass light carrying fibers. Both ends of all the fibers extending out of the ribbon are arranged to form a bundle which is plugged into a light source. In order to have the light leave the ribbon along one surface of the ribbon forming the extended light source, the claddings are partially or completely removed in a manner to insure that the distribution of light emitted along the length of the panel is uniform. A variety of ways, according to the principles of this invention, are described. A number of ribbons may be placed side by side to increase the width of the light panel.

It is thus a principal object of this invention to provide a fiber optic light panel of improved effectiveness and efficiency.

Other objects and advantages of this invention will hereinafter become obvious from the following description of preferred embodiments of this invention.

DESCRIPTION OF THE PREFERRED EMBODIMENTS

Figure 1:
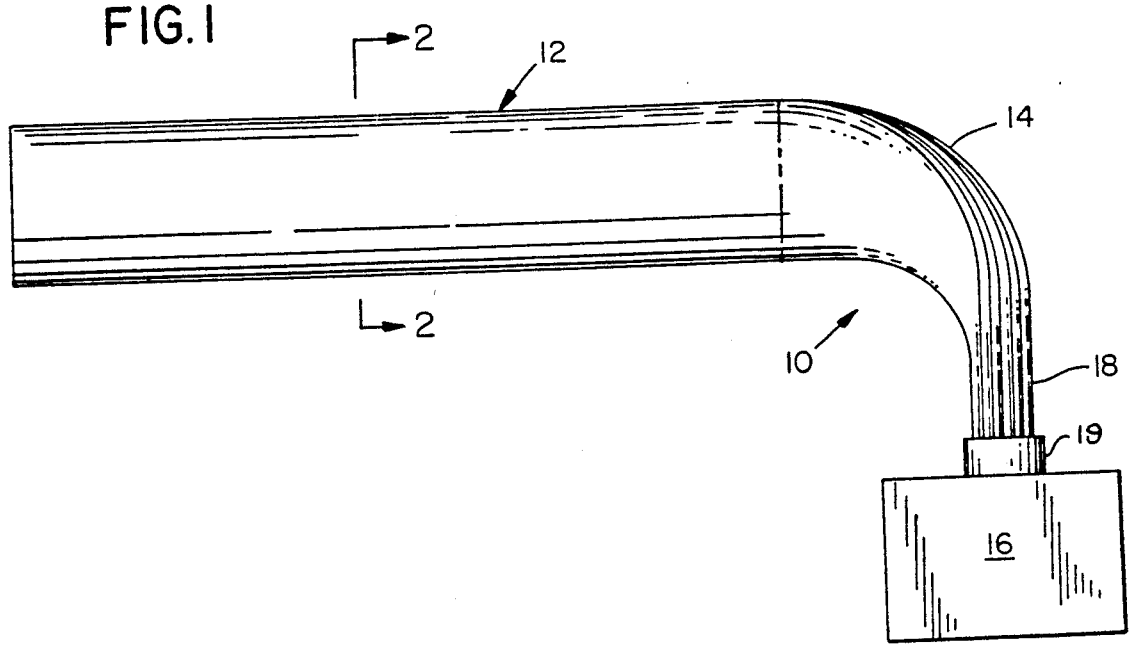
FIG. 1 is a schematized view of a panel connected to a source of light in accordance with a preferred embodiment of this invention.
Figure 2:
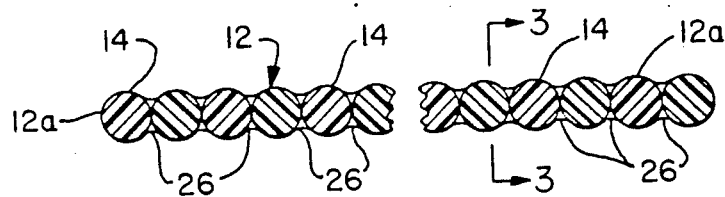
FIG. 2 is a section taken along 2—2 of FIG. 1.
Figure 2A:
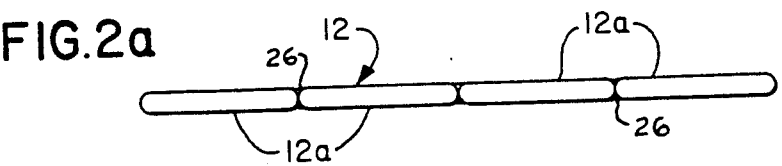
FIG. 2a is a schematized view similar to FIG. 2 showing how the ribbons are arranged to form the panel.

Referring to FIGS. 1, 2 and 2a, light panel system 10 consists of a flat light panel 12, optical fibers 14 extending from one end of panel 12, and a light source 16.

Optical fibers 14 as is understood in the art are glass, plastic, or liquid core fibers with suitable glass or plastic cladding, respectively, currently being used in fiberoptic communication systems. Such cladding is very thin, typically only about 0.001" thick. The liquid core fibers are made from plastic tubing filled with liquid, the tubing being provided with suitable cladding on the outside. All of these fibers are available commercially and come in a variety of sizes and materials depending on the light spectrum and distances to be transmitted. The details of construction of the fibers shown herein do not form a part of this invention.

Optical fibers 14 coming out of panel 12 are formed into a bundle 18 enclosed in a tip 19 which is plugged into light source 16. As is understood in the art, light source 16 would contain a source of light such as an incandescent bulb and optical fibers 14 would carry the light to light panel 12.

Light panel 12 is constructed of a plurality of extended ribbons 12a which are cemented together side by side in the manner shown, using an expoxy 26 or other suitable adhesive. Each ribbon 12a consists of optical fibers 14 placed parallel and contiguous to each other and similarly cemented together by epoxy 26 or other adhesive. Light panel 12 in accordance with this invention is thus constructed of a single layer of fibers 14 arranged parallel to and adjacent each other.

The use of ribbons 12a makes it possible to assemble conveniently a light panel in any width which is required while at the same time standardizing the manufacture of the ribbon itself. In addition, such a light panel is vertually the thickness of a single glass or plastic fiber 14.

Figure 3:
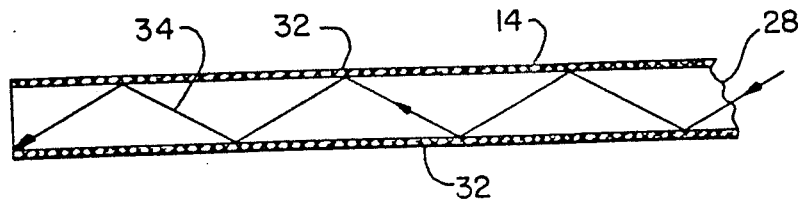
FIG. 3 is a section taken along 3—3 of FIG. 2 prior to removal of cladding.

As seen in FIG. 3, each optical fiber 14 consists of a core 28 of transparent glass or plastic with a cladding 32 which keeps each light ray 34 contained within core 28 as is understood in the art.

Figure 4:
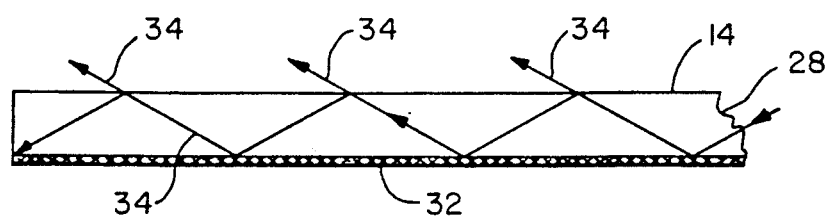
FIG. 4 is a view similar to that of FIG. 3 with cladding removed on one side of a fiber to permit light to escape one side of the fiber and hence the ribbon.

In order to permit light panel 12 to emit light along one surface it is necessary to remove some or all of cladding 32 along that surface. As seen in FIG. 4, cladding 32 has been removed from one side of core 28. This results in light leaving panel 12 along one surface as indicated by arrows 34.

Cladding 32 along the light emitting side of panel 12 can be removed by abrasion (i.e., sanding), scraping, or by chemical etching, or other suitable means, depending upon the material being utilized for the cladding. For example, it has been found that the cladding on plastic fibers can be conveniently eroded away by the application of a brush whose bristles are made of glass fibers. Any brush having bristles sufficiently hard to remove the cladding may be employed. A brush having bristles harder than glass can be employed to remove the cladding from glass fibers.

To remove by chemical means the cladding on plastic fibers may be removed by the use of 1,1,1-trichloroethane. Hydrofluoric acid may be employed to etch away the cladding on glass fibers.

It has been found also that UV radiation can be employed to break down plastic so that such radiation would be useful to remove the plastic cladding on plastic fibers.

To overcome the problem that the light may be brighter at the end of panel 12 closest to the light source, the removal can be conducted non-uniformly that is by removing less cladding along the panel closer to the source of light.

Figure 5:
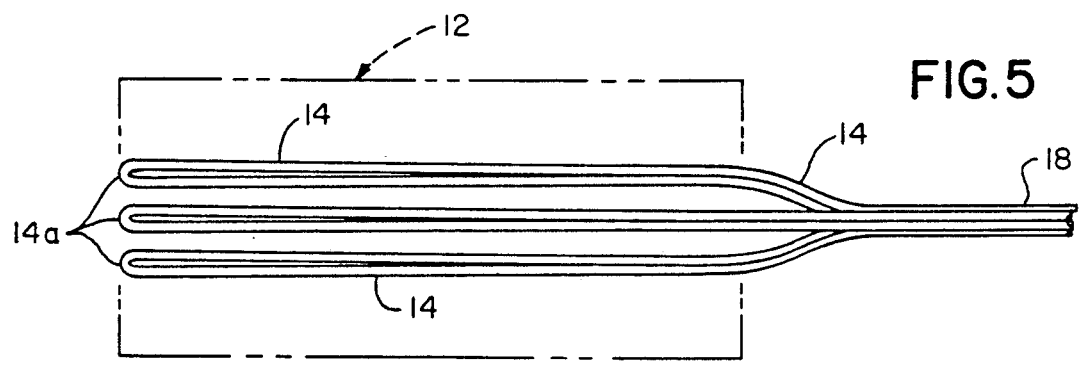
FIG. 5 is a detail of the ribbon showing one arrangement of the fibers.

Another way of obtaining a more uniform light display is shown in the arrangement of FIG. 5. There it is seen that each fiber 14 extends from light source 16 into one end of panel 12, the full length of panel 12, makes a loop 14a at the far end of panel 12, and then returns to the light source end of panel 12 where the fiber 14 is combined with the other identical fibers into bundle 18 which plugs in to the light source as shown in FIG. 1.

Figure 6:
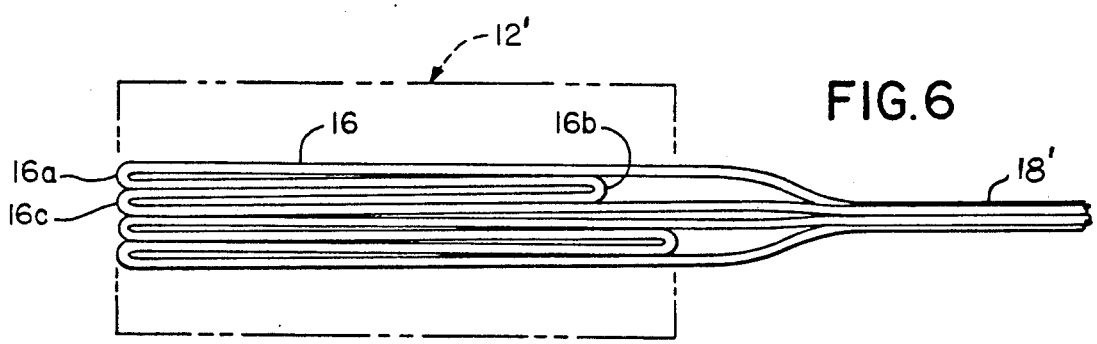
FIG. 6 is a detail of the ribbon showing an alternative arrangement of the fibers.

To obtain an even more even distribution of light over the surface of panel 12, the arrangement of optical fibers shown in FIG. 6 may be employed. In this arrangement, each of optical fibers 16, otherwise identical to fiber 14, is formed into a W-shaped configuration. Fiber 16 coming from the light source extends the full length of panel 12', forms a first loop 16a at the far end of panel 12', extends back the full length of panel 12' to the light source end, forms a second loop 16b, extends again the full length of the light panel forming a third loop 16c at the far end of panel 12' and then returns to the light source end of the panel and on to the light source by way of bundle 18'. The lengths of fibers 16, as well as fibers 14 shown in FIG. 5, are contiguous to each other as shown in FIG. 2.

In the manufacture of panel 12, optical fibers 14 are assembled in the manner described in connection with FIGS. 1 and 2, in a suitable array such as that shown in either FIG. 5 or FIG. 6. The side of panel 12 which is to be the light emitting side is then treated to remove some or all of the cladding on that side of the fibers. As previously noted, this can be done by either abrasion or etching, the use of a brush, although other suitable methods may be employed.

Figure 7:
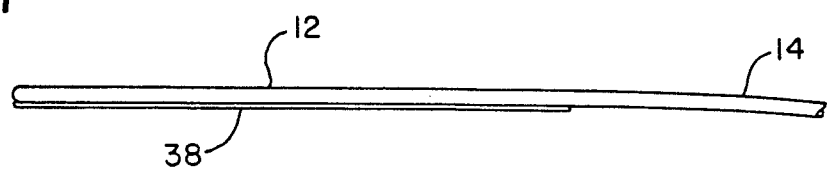
FIG. 7 is an end view of the ribbon showing the use of a reflective surface.

As shown in FIG. 7, the side of panel 12 which is not to emit any light may be provided with a reflective surface such as a mirror or a plate 38 with a white reflective surface facing the fibers, to reflect as much light as possible out of the light emitting surface of the panel.

It is readily seen that there has been provided a light panel which is capable of delivering light evenly over a whole surface and can be made conveniently of any selected length and width. At the same time, the light panel of this invention can be extremely thin, not much more than the diameter of the optical fibers themselves, so that it can be used in places heretofore difficult to place a light source.

While only certain preferred embodiments of this invention have been described it is understood that many variations are possible without departing from the principles of this invention as defined in the claims which follow.

What is claimed is:

1. A flat ribbon for emitting light from one side thereof comprising a plurality of a single layer of optical fibers in a cladding arranged side by side in a parallel array contiguous with each other, each fiber extending the length of said ribbon from a source of light supplied to both ends of each fiber within said ribbon, the cladding being removed from said fibers on the light emitting side of said ribbon to form a uniform light emitting surface.

2. The ribbon of claim 1 in which each fiber forms a loop at the far end of said ribbon opposite the end where the fiber receives light from the source of light, said fiber returning to the light source end of said ribbon for providing uniform light distribution from said ribbon and permitting the light source to be connected to one end of said ribbon.

3. The ribbon of claim 1 in which said fibers are cemented together.

4. The ribbon of claim 1 in which all of the fibers extending out of said ribbon are formed into a bundle, the end of said bundle being plugged into said source of light.

5. The ribbon of claim 1 in which said ribbon is joined with a second ribbon in a flat, side by side configuration to form a light emitting panel whose width is determined by the number of ribbons assembled.

6. The ribbon of claim 1 having a reflective surface mounted on the non-light emitting side of said ribbon.

7. The ribbon of claim 1 in which said cladding is removed in a manner to permit uniform light emitting characteristics along the length of said ribbon.

8. A flat ribbon for emitting light from one side thereof comprising a plurality of a single layer of optical fibers in a cladding arranged side by side in a parallel array contiguous with each other, each fiber extending the length of said ribbon from a source of light supplied to both ends of each fiber within said ribbon, the cladding being removed from said fibers on the light emitting side of said ribbon, each said fiber forming a first loop at the far end of said ribbon opposite the end where the fiber is connected to said source of light, a second loop at the light source end of said ribbon, and a third loop at the far end of said ribbon, before leaving the light source end of said ribbon, so that both ends of the fiber within said ribbon leave the same end of said ribbon for connection to said light source.

9. The method of making a light emitting ribbon comprising the steps of arranging a plurality of clad optical fibers in a parallel, side by side array forming a single layer of single fiber thickness, connecting both ends of said fibers to a source of light, and removing cladding from said fibers along one surface of said ribbon in a manner to provide a uniform light emitting surface on one side of said ribbon.

10. The method of claim 9 wherein each of said fibers is arranged to form a loop at the far end of said ribbon from said source of light and returned to said source of light so that both ends of each said fiber at one end of said ribbon are connected to said source of light.

11. The method of claim 9 in which each said fiber is arranged to form a first loop at the far end of said ribbon, a second loop at the near end of said ribbon, a third loop at the far end of said ribbon, and returns to said near end for connection to said source of light.

12. The method of claim 9 in which the non-emitting side of said ribbon is coated with a light reflective surface to increase the amount of light emitted from the light emitting side of said ribbon.

13. The method of claim 9 in which a plurality of each said ribbons are placed side by side with each other to form a light emitting panel.

14. The method of claim 9 in which said cladding is removed by abrasion.

15. The method of claim 9 in which said cladding is removed by etching.

* * * * *